US008800625B2

(12) United States Patent
Kishizoe

(10) Patent No.: US 8,800,625 B2
(45) Date of Patent: Aug. 12, 2014

(54) PNEUMATIC TIRE

(75) Inventor: Isamu Kishizoe, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 476 days.

(21) Appl. No.: 12/637,235

(22) Filed: Dec. 14, 2009

(65) Prior Publication Data

US 2010/0147437 A1 Jun. 17, 2010

(30) Foreign Application Priority Data

Dec. 15, 2008 (JP) .................... 2008-318472

(51) Int. Cl.
*B60C 15/00* (2006.01)
*B60C 15/06* (2006.01)

(52) U.S. Cl.
USPC ............ 152/538; 152/541; 152/546; 152/547

(58) Field of Classification Search
USPC ........................................... 152/555
See application file for complete search history.

(56) References Cited

U.S. PATENT DOCUMENTS

| 4,203,481 | A | * | 5/1980 | Ranik, Jr. ................ | 152/517 |
| 4,257,469 | A | * | 3/1981 | Uemura .................... | 152/554 |
| 5,385,193 | A | * | 1/1995 | Suzuki et al. ............. | 152/525 |
| 5,733,395 | A | * | 3/1998 | Nakagawa ................ | 152/525 |
| 8,025,084 | B2 | * | 9/2011 | Kojima .................... | 152/539 |
| 2010/0043935 | A1 | * | 2/2010 | Fukunaga et al. ......... | 152/454 |

FOREIGN PATENT DOCUMENTS

| EP | 0 744 305 | | 11/1996 |
| EP | 1002667 | * | 5/2000 |
| EP | 1 083 064 | | 3/2001 |
| EP | 1 640 188 | | 3/2006 |
| EP | 2 006 123 | | 12/2008 |
| JP | 63-8003 | * | 1/1988 |
| JP | 2000-309208 | | 11/2000 |
| JP | 2002-127712 | | 5/2002 |
| JP | 2002-160510 | | 6/2002 |
| JP | 2005-007959 | | 1/2005 |
| JP | 2007-191044 | | 8/2007 |
| WO | 2008/062608 | | 5/2008 |
| WO | WO 2008/114666 | * | 9/2008 |

* cited by examiner

Primary Examiner — Justin Fischer
(74) Attorney, Agent, or Firm — Hamre, Schumann, Mueller & Larson, P.C.

(57) ABSTRACT

A pneumatic tire includes: a pair of bead portions including a bead core and a bead filler; a carcass layer having a single-layered structure and extending between the bead portions; and a plurality of belt layers disposed at outer circumference of the carcass layer, wherein the carcass layer is folded around the bead core to enfold the bead filler and to have a folded portion that extends to a position beneath a side edge portion of one of the belt layers, and wherein the pneumatic tire further includes a rubber reinforcing layer made of rubber having JIS hardness in a range from 70 to 100 and having average thickness in a range from 0.5 mm to 3.0 mm, the rubber reinforcing layer being disposed on the folded portion at a side wall portion to extend across a maximum width position Pm of the carcass layer.

5 Claims, 4 Drawing Sheets

PNEUMATIC TIRE

CROSS-REFERENCE TO THE RELATED APPLICATION(S)

The present disclosure relates to the subject matters contained in Japanese Patent Application No. 2008-318472 filed on Dec. 15, 2009, which are incorporated herein by reference in its entirety.

FIELD

The present invention relates to a pneumatic tire capable of improving driving stability and reducing weight.

BACKGROUND

In recent years, there are increasing demands for reduction of fuel consumption of vehicles as part of countermeasures for preservation of the environment. As one of the countermeasures, weight reduction of a pneumatic tire is strongly required. Also, driving stability is required to be improved in accordance with the improvement of the performance of vehicles. In addition, the driving stability is desired to be improved without sacrificing driving comfortableness, which is tire performance conflicting with the driving stability.

In a conventionally known pneumatic tire, a two-layered carcass layer is provided between right and left bead portions so as to exhibit high movement performance. An example of such structure is disclosed in JP-A-2007-191044. Such a pneumatic tire is also required to reduce its weight and to improve the driving stability as described above, and techniques to obtain these advantages have been desired to be proposed.

SUMMARY

One of objects of the present invention is to provide a pneumatic tire capable of improving the driving stability and reducing its weight without sacrificing the driving comfortableness.

According to an aspect of the invention, there is provided a pneumatic tire including: a pair of bead portions provided to face each other in a tire width direction, each of the bead portions including: a bead core; and a bead filler that buries the bead core, the bead filler being made of rubber having JIS hardness in a range from 70 to 100; a carcass layer having a single-layered structure and extending between the bead portions, the carcass layer comprising reinforcing cords extending in a tire radial direction and being arranged in a tire circumferential direction; and a plurality of belt layers disposed at outer circumference of the carcass layer at a tread portion, wherein the carcass layer is folded around the bead core from inside to outside in a tire axial direction to enfold the bead filler and to have a folded portion that extends to a position beneath a side edge portion of one of the belt layers, and wherein the pneumatic tire further includes a rubber reinforcing layer made of rubber having JIS hardness in a range from 70 to 100 and having average thickness in a range from 0.5 mm to 3.0 mm, the rubber reinforcing layer being disposed on the folded portion of the carcass layer at an outer side in the tire axial direction at a side wall portion to extend across a maximum width position Pm of the carcass layer.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Figure 1:
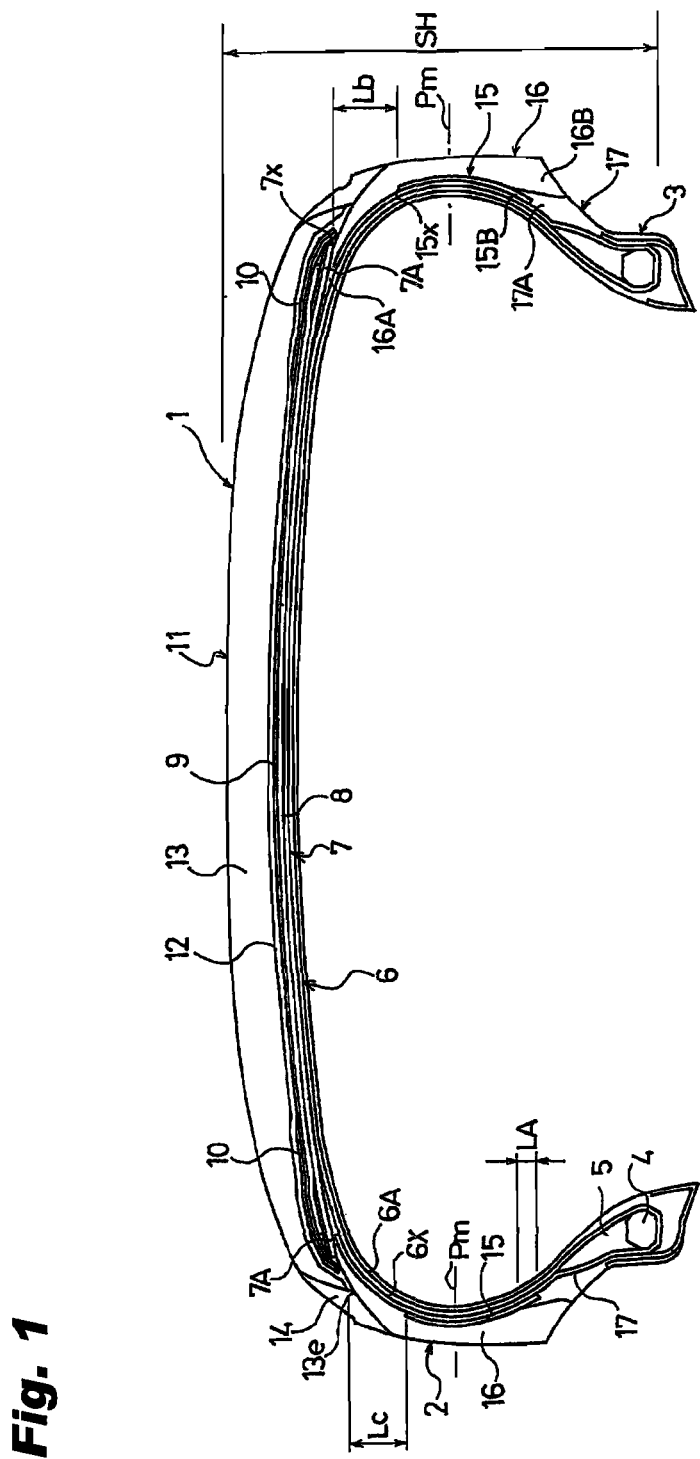
FIG. 1 is a cross-sectional view taken on a meridian of a pneumatic tire according to an embodiment of the invention.

Hereinafter, embodiments of the invention will be described with reference to the drawings. In the following description, the same or similar components will be denoted by the same reference numerals, and the duplicate description thereof will be omitted.

FIG. 1 shows a pneumatic tire according to an embodiment of the present invention. The pneumatic tire has a tread portion 1, a sidewall portion 2 and a bead portion 3.

A bead core 4 is buried in each of the right and left bead portions 3. A bead filler 5 having a triangle cross-section is provided on a side of the outer circumference of each bead core 4. The bead filler 5 is made of rubber alone and has hardness according to JIS (hereinafter referred to as the JIS hardness) in a range from 70 to 100. When the JIS hardness of the bead filler 5 is lower than 70, the bead filler 5 may not exhibit its function to make contribution to the driving stability. On the contrary, when the JIS hardness exceeds 100, the driving comfortableness may be degraded.

A carcass layer 6 in which reinforcing cords extending along a tire radial direction and arranged along a tire circumferential direction are buried in a rubber layer is extended between the right and left bead portions 3. An angle between the reinforcing cord of the carcass layer 6 against the tire circumferential direction is in a range to from 75 degrees to 90 degrees. When the angle is smaller than 75 degrees, the durability may be lowered. The angle is preferably set to be in a range from 75 degrees to 86 degrees for attaining circumferential rigidity of the tire because the reinforcing cords disposed in a folded portion 6X described below and the reinforcing cords disposed in a body portion 6A positioned between the bead cores 4 may cross each other when the angle is thus set.

On a side of the outer circumference of the carcass layer 6 of the tread portion 1, two (or a plurality of) belt layers 7 and 8 including reinforcing cords such as steel cords extending obliquely against the tire circumferential direction are provided, with the reinforcing cord of one belt layer crossing the reinforcing cord of the other belt layer. As the two belt layers 7 and 8, the first belt layer 7 adjacent to the carcass layer 6 and the second belt layer 8 disposed on a side of the outer circumference of the first belt layer 7 are provided, and the first belt layer 7 has a larger width than the second belt layer 8.

On a side of the outer circumference of the belt layers 7 and 8, a belt full covering layer 9 and a belt edge covering layer 10, each of which is obtained by spirally winding an organic fiber cord in the tire circumferential direction, are provided. A tread rubber layer 11 is provided on a side of the outer circumference of these covering layers 9 and 10. The tread rubber layer 11 includes an under tread rubber layer 12 disposed on a side of the inner circumference, a cap tread rubber layer 13 disposed on a side of the outer circumference of the under tread rubber layer 12 and a wing tip rubber layers 14 disposed on both sides of the cap tread rubber layer 13.

The carcass layer 6 has a single-layered structure provided as a single layer, and each edge thereof is folded around the bead core 4 from the inside to the outside along a tire axial direction so as to enfold the bead filler 5. Each folded portion 6X thus folded is extended over the sidewall portion 2 to reach an inner circumferential portion of an edge 7A of the first belt layer 7 of the tread portion 1.

In other words, folded portion 6X extends to a position beneath a side edge portion (the edge 7A) of the first belt layer 7.

A rubber reinforcing layer 15 made of rubber alone is provided in a ring shape along the tire circumferential direction so as to be adjacent to the outside along the tire axial direction of the folded portion 6X of the carcass layer 6 of each of the right and left sidewall portions 2. The rubber reinforcing layer 15 has the same hardness as the bead filler 5 of, specifically, JIS hardness in a range from 70 to 100. The rubber reinforcing layer 15 has an average thickness in a range from 0.5 mm to 3.0 mm, and is disposed along the folded portion 6X across a maximum width position Pm of the carcass layer (i.e., a position where the body portion 6a of the carcass layer extending between the bead portions 3 has the maximum width).

In each sidewall portion 3, a side rubber layer 16 is disposed outside along the tire axial direction of the rubber reinforcing layer 15. The side rubber layer 16 extends to be longer than the rubber reinforcing layer 15 along the tire radial direction, has an outer circumferential edge 16A disposed on a side of the inner circumference of the edges of the belt layers 7 and 8 and has an inner circumferential edge 16B extended to a position overlapping, in a side view, an outer circumferential edge 5A of the bead filler 5.

A rim cushion rubber layer 17 extends from the bead portion 3 to the side rubber layer 16 outside along the tire axial direction of the folded portion 6X of the carcass layer 6. The rim cushion rubber layer 17 has an outer circumferential edge 17A overlapping, in a side view of the tire, the inner circumferential edge 16B of the side rubber layer 16 and an inner circumferential edge 15B of the rubber reinforcing layer 15.

The JIS hardness of rubber included in the side rubber layer 16 is lower than the JIS hardness of rubber included in the rim cushion rubber layer 17, and the JIS hardness of the rubber included in the rim cushion rubber layer 17 is lower than the JIS hardness of rubber included in the bead filler 5 and the rubber reinforcing layer 15.

In the pneumatic tire according to the embodiment, the carcass layer 6 has the single-layered structure instead of the conventional two-layered structure, and therefore, the weight reduction may be attained. Furthermore, since each folded portion 6X of the carcass layer 6 is extended to the inner circumferential portion of the edge 7A of the belt layer 7 of the tread portion 1, the carcass layer 6 attains a two-layered structure in the sidewall portion 2. Therefore, the driving stability at the same level as in the conventional technique may be attained by this carcass layer 6, and in addition, since the rubber reinforcing layer 15 with high hardness is disposed in the sidewall portion 2, the rigidity of the sidewall portion 2 may be improved, resulting in improving the driving stability.

Moreover, since the rubber reinforcing layer 15 is made of rubber with the hardness equivalent to that of the bead filler 5, the rigidity of a portion disposed from the sidewall portion 2 to the bead portion 3 may be distributed more uniformly than in the conventional technique. Therefore, input (vibration) from a road surface may be received by the whole of the sidewall portion 2 and the bead portion 3, and hence, degradation of the driving comfortableness may be suppressed.

Furthermore, since each folded portion 6X of the carcass layer 6 is extended to the inner circumferential portion of the edge 7A of the belt layer 7 of the tread portion 1 and the edge of the folded portion 6X of the carcass layer 6 is disposed away from the rubber reinforcing layer 15 with the high rubber hardness, stress concentration on the rubber reinforcing layer 15 otherwise caused by the edge of the folded portion 6X may be avoided, so as to prevent degradation of high-speed durability.

Moreover, since the edge of the carcass layer is disposed on a side of the inner circumference of the edge 7A of the belt layer 7, the movement of the edge of the carcass layer is restricted by the edge 7A of the belt layer 7, resulting in attaining an effect to suppress edge separation of the carcass layer 6.

When the rubber reinforcing layer 15 has an average thickness smaller than 0.5 mm or includes rubber with the JIS hardness lower than 70, it may become difficult to effectively improve the driving stability. On the other hand, when the average thickness of the rubber reinforcing layer 15 exceeds 3.0 mm or the JIS hardness of the rubber exceeds 100, the driving comfortableness may be largely degraded.

A distance Lb along the tire radial direction between an outer circumferential edge 15x of the rubber reinforcing layer 15 and the closest edge 7x of the first belt layer 7 is preferably set to be in a range from 5% to 25% of a tire cross-sectional height SH. When the distance Lb is smaller than 5% of the tire cross-sectional height SH, stress may be concentrated on the edges close to each other so as to easily disadvantageously cause edge separation. When the distance Lb exceeds 25% of the tire cross-sectional height SH, it may become difficult to improve the driving stability.

A distance Lc along the tire radial direction between the outer circumferential edge 15x of the rubber reinforcing layer 15 and an edge 13e of the cap tread rubber layer 13 is preferably set to 10 through 30% of the tire cross-sectional height SH for the same reasons as described above.

A lap length LA between the inner circumferential edge 15B of the rubber reinforcing layer 15 and the outer circumferential edge 17A of the rim cushion rubber layer 17 adjacent to each other is preferably in a range from 5 mm to 15 mm along the tire radial direction. When the lap length LA is smaller than 5 mm, these edges are too close to each other, and hence, edge separation may be easily caused. When the lap length LA exceeds 15 mm, the rigidity of the sidewall portion 3 may be made uneven, resulting in degrading the driving comfortableness.

The JIS hardness of rubber included in the side rubber layer 16 may be in a range from 40 to 60, and the JIS hardness of rubber included in the rim cushion rubber layer 17 may be in a range from 60 to 80. When the JIS hardness of the rubber included in the side rubber layer 16 is lower than 40, the driving stability may be degraded. On the contrary, when the JIS hardness of the rubber included in the side rubber layer 16 is higher than 60, the driving comfortableness may be degraded. When the JIS hardness of the rubber included in the rim cushion rubber layer 17 is lower than 60, the driving stability may be degraded. On the contrary, when the JIS hardness of the rubber included in the rim cushion rubber layer 17 is higher than 80, the driving comfortableness may be degraded.

Since the pneumatic tire described in the above is assumed to be not specified with a face or the direction to be fixed to a vehicle, the right and left rubber reinforcing layers 15 of the aforementioned pneumatic tire are configured to have the same average thickness and the same width. However, in a case where a face or the direction to be fixed to the vehicle is specified, the rubber reinforcing layer 15 positioned at an inner face, which is to be faced toward the vehicle when fixed thereto, may preferably have a smaller average thickness than the rubber reinforcing layer 15 positioned at an outer face opposing the inner face.

In a recent vehicle, wheels are fixed on the vehicle to achieve negative camber, so as to retain the driving stability in high speed drive. In such a vehicle, the right and left tires are inclined inward, and therefore, the load applied in high speed drive is larger in portions of the tires positioned at the inner face on the vehicle than in portions of the tires positioned at the outer face. On the other hand, the portions of the tires positioned at the outer face on the vehicle more largely affect the driving stability. Therefore, when the rubber reinforcing layer 15 positioned at the inner face on a vehicle has a smaller average thickness, a sidewall portion positioned at the inner face is more easily bent. Accordingly, while retaining the driving stability, the high-speed durability and the driving comfortableness can be improved by additionally providing such rubber reinforcing layers 15.

The average thickness of the rubber reinforcing layer 15 positioned at the inner face on a vehicle may be set to be in a range from 0.5 mm to 1.0 mm and the average thickness of the rubber reinforcing layer 15 positioned at the outer face may be set to be in a range from 1.0 mm to 2.0 mm.

Figure 2:
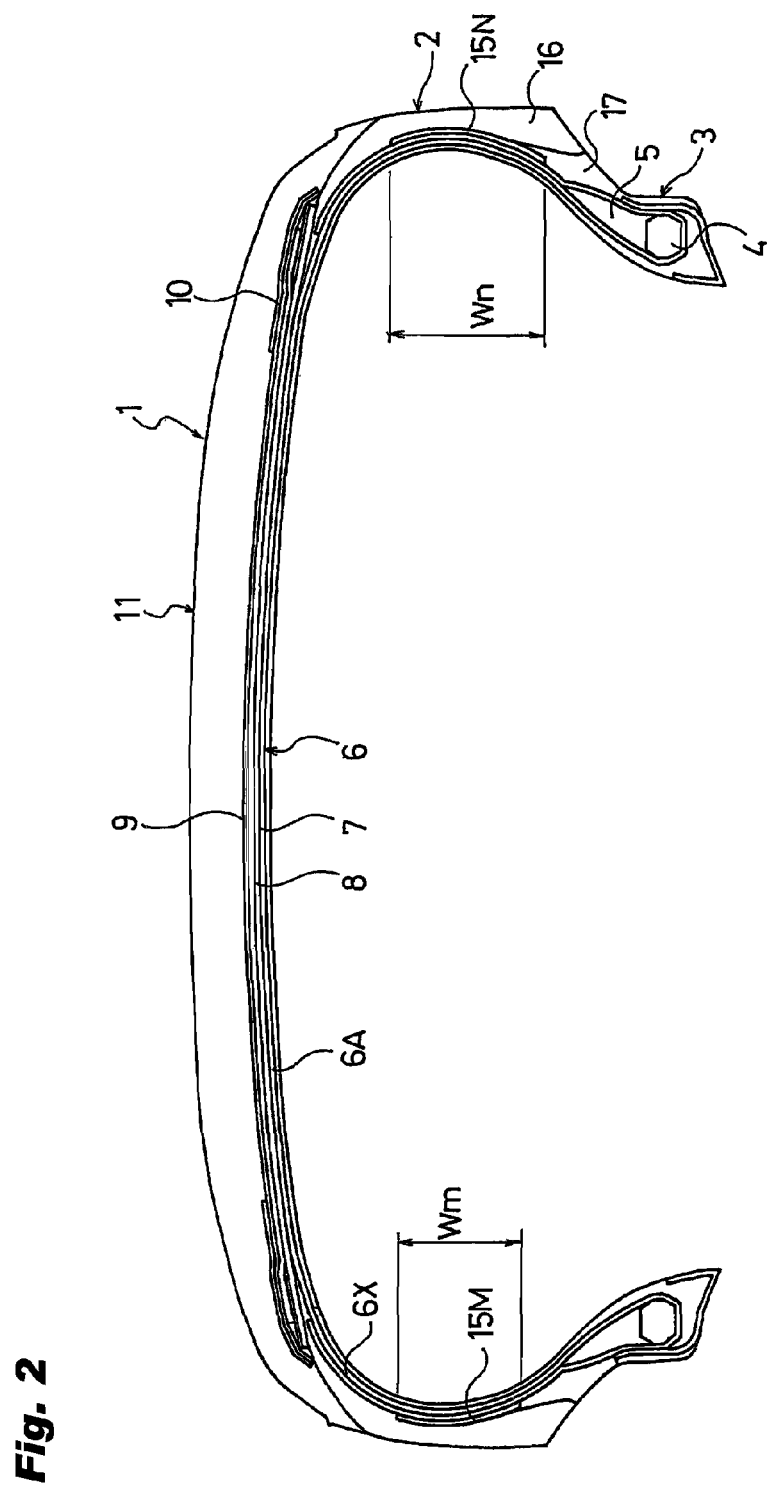
FIG. 2 is a cross-sectional view taken on a meridian of a pneumatic tire according to another embodiment of the invention.

The aforementioned advantages may be obtained by, instead of adjusting the thickness, setting a width Wm along the tire radial direction of a rubber reinforcing layer 15M positioned at the inner face on a vehicle to be smaller than a width Wn along the tire radial direction of a rubber reinforcing layer 15N positioned at the outer face as illustrated in FIG. 2. The width Wm along the tire radial direction of the rubber reinforcing layer 15M positioned at the inner face on a vehicle may be set to be in a range from 20 mm to 30 mm while the width Wn along the tire radial direction of the rubber reinforcing layer 15N positioned at the outer face may be set to be in a range from 30 mm to 50 mm.

Figure 3:
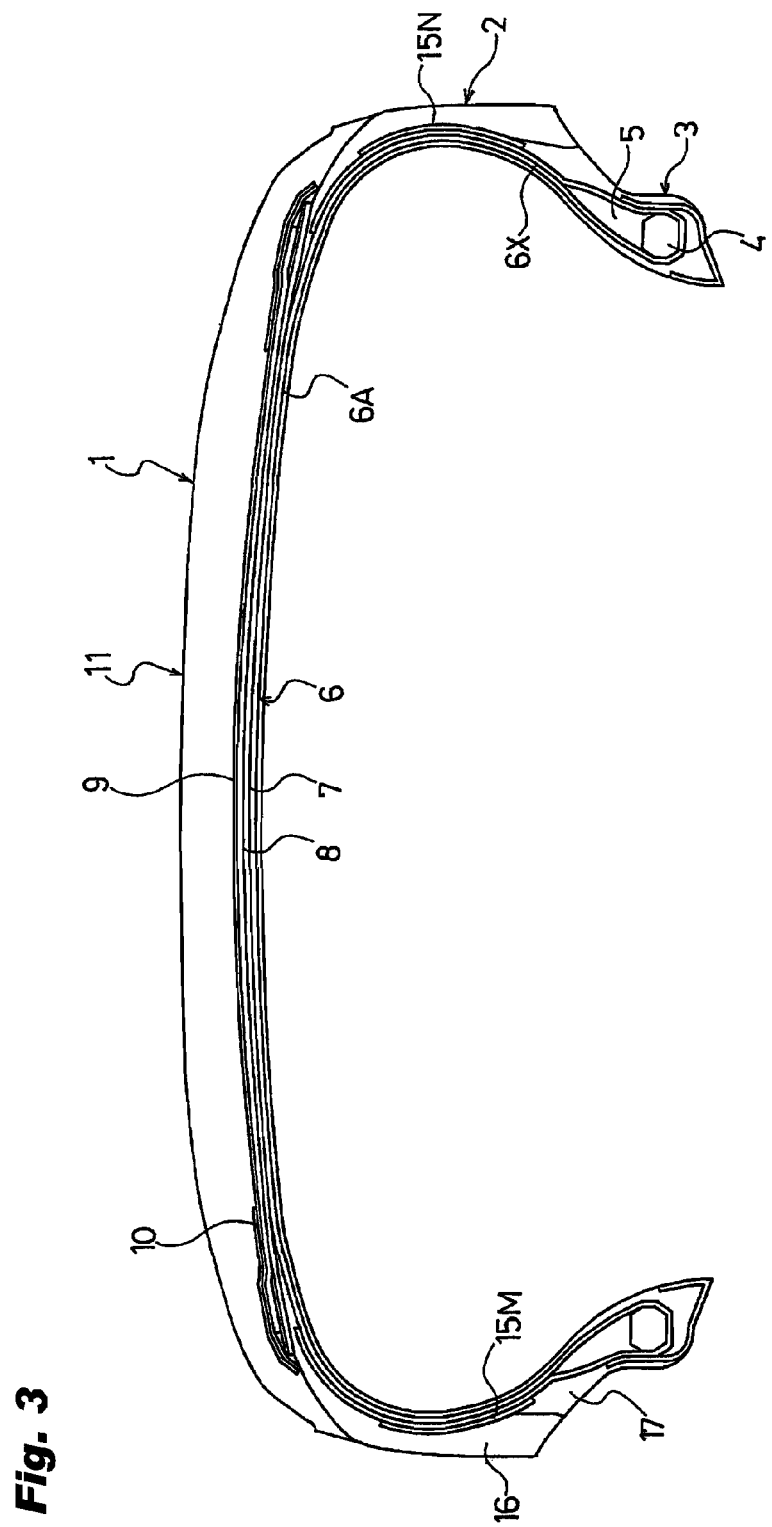
FIG. 3 is a cross-sectional view taken on a meridian of a pneumatic tire according to still another embodiment of the invention.

Alternatively, a rubber reinforcing layer 15M positioned at the inner face on a vehicle may be disposed more inward along the tire radial direction than a rubber reinforcing layer 15N positioned at the outer face as illustrated in FIG. 3. Specifically, the rubber reinforcing layer 15M positioned at the inner face on a vehicle may be disposed more inward by 5 mm through 20 mm along the tire radial direction than the rubber reinforcing layer 15N positioned at the outer face. Such rubber reinforcing layers 15M and 15N have the same average thickness and the same width along the tire radial direction. Alternatively, the average thickness, the width along the tire radial direction and the inward disposition may be appropriately combined for the adjustment.

The present invention is suitably employed for a pneumatic tire for a passenger car with an aspect ratio of 55% or less, however the present invention is not limited to such pneumatic tire. It is noted that the JIS hardness of rubber herein means hardness measured with a durometer type A in accordance with JISK 6253.

FIRST EXAMPLE

Test tires having a common tire size of 235/50R18 are manufactured as described below. The test tires include embodiment tires, comparative tires, and conventional tire.

Each of the embodiment tires 1-6 (Examples 1-6) according to the embodiment and the comparative tires 1-4 (Comparative Examples 1-4) are manufactured to have the structure as illustrated in FIG. 1, in which the both folded portions of the carcass layer (including the reinforcing cords extending at angle of 80 degrees against the tire circumferential direction) are extended to the inner circumferential portions of the both edges of the belt layer of the tread portion and rubber included in each rubber reinforcing layer disposed across the maximum width position of the carcass layer had JIS hardness and an average thickness as listed in Table 1.

Figure 4:
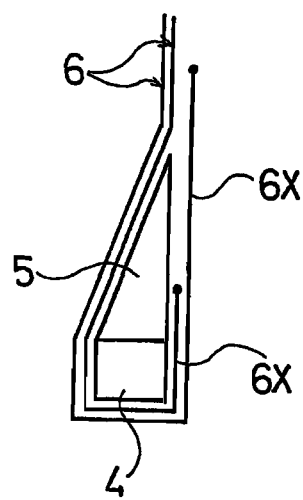
FIG. 4 is a cross-sectional explanatory view illustrating the structure of a carcass layer of a conventional tire.

The conventional tire (Conventional Example) is manufactured in the same structure as the embodiment tire 1 except that a carcass layer is configured to have a two-layered structure and folded portions of the carcass layer are positioned more inward along the tire radial direction than a maximum width position of the carcass layer as illustrated in FIG. 4. The conventional tire (Conventional Example) is also configured to have a structure having no rubber reinforcing layer.

In each of the test tires, the JIS hardness of rubber included in the bead filler is set to be 80, the JIS hardness of rubber included in the rim cushion rubber layer is set to be 70, and the JIS hardness of rubber included in the side rubber layer is set to be 60. Furthermore, in each of the embodiment tires and the comparative tires, the distance Lb along the tire radial direction between the outer circumferential edge of the rubber reinforcing layer and the closest edge of the first belt layer corresponds to 20% of the tire cross-sectional height SH, and the lap length LA between the inner circumferential edge of the rubber reinforcing layer and the outer circumferential edge of the rim cushion rubber layer is 10 mm.

Each of these test tires are subjected to evaluation tests for the tire weight, the driving stability, the driving comfortableness and the high-speed durability by methods described below, resulting in obtaining results listed in Table 1.

Tire Weight:

The weight of each test tire is measured. The measurement result is expressed with an index with the weight of the conventional tire regarded as an index of 100. As this index is larger, the tire weight becomes smaller and more weight reduction is attained.

Driving Stability:

Each test tire is assembled on an application rim to be fixed on a vehicle having engine displacement of 1500 cc with a tire pressure set to 250 kPa, and a feeling test is made by a test driver for the degree of stability obtained by making a lane change repeatedly while driving at a speed of 100 km/h. The evaluation result of the test is expressed with an index with the stability of the conventional tire regarded as an index 100. As this index is larger, the driving stability becomes higher.

Driving Comfortableness:

Each of the test tires is fixed on a vehicle having engine displacement of 1500 cc in the aforementioned manner, and a feeling test is made by a test driver in a test track The evaluation result of the test is expressed with an index with the driving comfortableness of the conventional tire regarded as an index of 100. As this index is larger, the driving comfortableness becomes higher.

TABLE 1

|  | CONVENTIONAL EXAMPLE | COMPARATIVE EXAMPLE 1 | EXAMPLE 1 | EXAMPLE 2 | EXAMPLE 3 | COMPARATIVE EXAMPLE 2 |
|---|---|---|---|---|---|---|
| JIS Hardness | — | 60 | 70 | 85 | 100 | 105 |
| Average thickness(mm) | — | 1.5 | 1.5 | 1.5 | 1.5 | 1.5 |
| Tire weight | 100 | 110 | 110 | 110 | 110 | 110 |
| Driving stability | 100 | 100 | 102 | 104 | 106 | 106 |
| Driving comfortableness | 100 | 106 | 104 | 102 | 100 | 96 |

|  | COMPARATIVE EXAMPLE 3 | EXAMPLE 4 | EXAMPLE 5 | EXAMPLE 6 | COMPARATIVE EXAMPLE 4 |
|---|---|---|---|---|---|
| JIS Hardness | 90 | 90 | 90 | 90 | 90 |
| Average thickness(mm) | 0.3 | 0.5 | 2.0 | 3.0 | 4.0 |
| Tire weight | 110 | 110 | 110 | 110 | 110 |
| Driving stability | 99 | 102 | 106 | 108 | 109 |
| Driving comfortableness | 105 | 106 | 101 | 100 | 98 |

It is understood from Table 1 that the embodiment tires (Example 1-6) are improved in the driving stability and attain the weight reduction without sacrificing the driving comfortableness.

SECOND EXAMPLE

Embodiment tires 7-9 (Examples 7-9) having the same tire size as that of Example 1 are manufactured as test tires as follows.

The embodiment tire 7 (Example 7) is manufactured to have the same structure as the embodiment tire 2 except that the average thickness of a rubber reinforcing layer positioned at the inner face on a vehicle is set to be smaller than the average thickness of a rubber reinforcing layer positioned at the outer face. The embodiment tire 8 (Example 8) is manufactured to have the same structure as the embodiment tire 2 except that the width along the tire radial direction of a rubber reinforcing layer positioned at the inner face on a vehicle is set to be smaller than the width along the tire radial direction of a rubber reinforcing layer positioned at the outer face.

The embodiment tire 9 (Example 9) is manufactured to have the same structure as the embodiment tire 2 except that a rubber reinforcing layer positioned at the inner face on a vehicle is set to be disposed more inward along the tire radial direction than a rubber reinforcing layer positioned at the outer face.

In the embodiment tire 7, the average thickness of the rubber reinforcing layer positioned at the inner face on a vehicle is 1.0 mm and that of the rubber reinforcing layer provided outer face is 2.0 mm. In the embodiment tire 8, the width along the tire radial direction of the rubber reinforcing layer positioned at the inner face on a vehicle is 30 mm and that of the rubber reinforcing layer positioned at the outer face is 50 mm. In the embodiment tire 9, the rubber reinforcing layer positioned at the inner face on a vehicle is offset by 10 mm inward along the tire radial direction as compared with the rubber reinforcing layer positioned at the outer face.

Each of these test tires and the embodiment tire 2 are subjected to an evaluation test for high-speed durability by a method described below, resulting in obtaining results listed in Table 2. Also, the embodiment tires 7-9 are evaluated for the tire weight, the driving stability and the driving comfortableness by the methods described in Example 1, and results are listed also in Table 2.

High-Speed Durability:

Each of the test tires is assembled on an application rim and fixed on a drum test machine with a tire pressure set to 250 kPa, and with the load set to 80% of the load corresponding to the maximum load performance described in JATMA and the camber angle set to −2.5 degrees, the speed is increased from 200 km/h by 10 km/h every 10 minutes, so as to obtain the speed at which the test tire is ruptured. The evaluation result is expressed with an index with the result of the test tire 2 regarded as an index of 100. As this index is larger, the high-speed durability becomes higher.

TABLE 2

|  | EXAMPLE 7 | EXAMPLE 8 | EXAMPLE 9 |
|---|---|---|---|
| JIS Hardness | 85 | 85 | 85 |
| Average thickness(mm) | 1.0/2.0 | 1.5 | 1.5 |
| High-speed durability | 107 | 107 | 106 |
| Tire weight | 110 | 110 | 110 |
| Driving stability | 104 | 104 | 104 |
| Driving comfortableness | 104 | 104 | 104 |

It is understood from Table 2 that the embodiment tires 7-9 are improved in the high-speed durability as compared with the embodiment tire 2 in which the rubber reinforcing layers is provided laterally symmetrically. Furthermore, it is understood that the driving comfortableness may be thus improved.

It is to be understood that the present invention is not limited to the specific embodiment described above and that the present invention can be embodied with the components modified without departing from the spirit and scope of the present invention. The present invention can be embodied in various forms according to appropriate combinations of the components disclosed in the embodiments described above. For example, some components may be deleted from the configurations described as the embodiment.

What is claimed is:

1. An assembly, comprising:
a rim; and
a pneumatic tire that is assembled on the rim,
wherein the pneumatic tire comprises
a pair of bead portions provided to face each other in a tire width direction, each of the bead portions comprising:
a bead core; and
a bead filler that buries the bead core, the bead filler being made of rubber having a JIS hardness in a range from 70 to 100, wherein a radially inner surface of each of said bead cores is positioned at the same height;
a carcass layer having a single-layered structure and extending between the bead portions, the carcass layer comprising reinforcing cords extending in a tire radial direction and being arranged in a tire circumferential direction; and
a plurality of belt layers disposed at an outer circumference of the carcass layer at a tread portion,
wherein the carcass layer is folded around the bead core from inside to outside in a tire axial direction to enfold the bead filler and to have a folded portion that extends to a position beneath a side edge portion of one of the belt layers,
wherein the pneumatic tire further comprises a rubber reinforcing layer is made of rubber, having a JIS hardness in a range from 70 to 100 and having an average thickness in a range from 0.5 mm to 3.0 mm, the rubber reinforcing layer being disposed on the folded portion of the carcass layer at an outer side in a tire axial direction at a sidewall portion to extend across a maximum width position Pm of the carcass layer,
wherein an inner face toward which the pneumatic tire is fixed to a vehicle and an outer face opposing the inner face are defined, and
wherein a rubber reinforcing layer positioned at the inner face is provided more inward in the tire radial direction than a rubber reinforcing layer positioned at the outer face.

2. The assembly according to claim 1, wherein a distance along the tire radial direction between an outer circumferential edge of the rubber reinforcing layer and a closest edge of the belt layer is set to be in a range from 5% to 25% of a tire cross-sectional height SH.

3. The assembly according to claim 1, wherein the reinforcing cords of the carcass layer are configured to extend at an angle being set in a range from 75 degrees to 90 degrees against the tire circumferential direction.

4. The assembly according to claim 1, further comprising a side rubber layer disposed on the rubber reinforcing layer at an outer side in the tire axial direction at the sidewall portion; and a rim cushion rubber layer disposed on the folded portion at an outer side in the tire axial direction to extend from the bead portion to the side rubber layer, wherein the side rubber layer has a JIS hardness that is lower than that of the rim cushion rubber layer, wherein the rim cushion rubber layer has a JIS hardness that is lower than that of the bead filler and the rubber reinforcing layer, wherein the side rubber layer has a JIS hardness in a range from 40 through 60, and wherein the rim cushion rubber layer has a JIS hardness in a range from 60 to 80.

5. The assembly according to claim 4, wherein an inner circumferential edge of the rubber reinforcing layer and an outer circumferential edge of the rim cushion rubber layer adjacent to each other are configured to overlap when viewed from a side of the pneumatic tire to have a lap length in a range from 5 mm to 15 mm in the tire radial direction.

* * * * *